April 27, 1948. C. R. IRONS 2,440,664

MAKING LAP-WELDED ARTICLES FROM THERMOPLASTIC FILMS

Filed July 28, 1945

INVENTOR.
Carroll R. Irons
BY
Griswold & Burdick
ATTORNEYS

Patented Apr. 27, 1948

2,440,664

UNITED STATES PATENT OFFICE 2,440,664

MAKING LAP-WELDED ARTICLES FROM THERMOPLASTIC FILMS

Carroll R. Irons, Midland, Mich., assignor to The Dow Chemical Company, Midland, Mich., a corporation of Delaware Application July 28, 1945, Serial No. 607,533

2 Claims. (Cl. 154—42)

This invention relates to a method whereby lap welds may be produced in at least two of a plurality of layers of thermoplastic films without joining more than two edges at each weld. It relates in particular to a method for producing a lap-welded thin-walled tube from thermoplastic film.

Various manual and mechanical methods have been suggested for welding thermoplastic films. Such methods commonly involve the localized heating of two overlapping films on both outer surfaces opposite the intended weld, and confining the heating to a narrow zone and to a short period of time. When using such known methods to make wider sheets from two narrow ones, either lap welds or edge welds may be made. When, however, it is attempted to use the method for the sealing of bags, or for the preparation of tubes from flat sheets, only edge or "fin" welds have been possible.

It would be distinctly advantageous to be able to produce lap welds in at least two of a plurality of thermoplastic film layers, between a single pair of heating elements, without joining more than two of the layers of film at each weld. It is an object of the present invention to provide such a method, and particularly one in which a lap-welded thin-walled tube may be formed either from one or from two sheets of plastic foil.

It has now been found that the foregoing and related objects may be attained, and that a lap weld may be made, or two lap welds may be made concurrently, between a single pair of heating elements, in the presence of other layers of the same plastic material, by lapping the pairs of film edges to be welded, interposing between the lapped pair of edges and other layers of plastic present, a thin barrier which prevents adherence between those plastic layers which are not to be welded, and applying heat and pressure to the assembly to effect fusion or welding of the two layers composing the lapped pair of edges. In this manner there may be made simultaneously two lap-welded sheets from four pieces of film, or one sheet from three pieces of film, or a lap-welded tube from two pieces of film, or from a single film, as shown diagrammatically in Figs. 1–4, respectively, in the annexed drawing.

In the said drawing, Figs. 1–3 are cross-sectional views to illustrate the use of a non-adherent, non-plastic slip-sheet interposed between two pairs of overlapping film edges to be welded;

Figure 1:
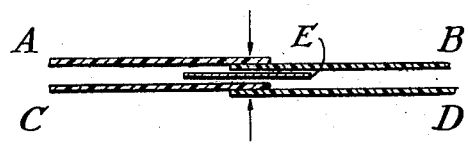

The arrows in the drawing represent the localized application of heat and pressure.

Figure 2:
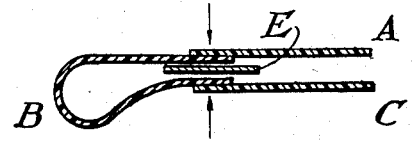
Figure 3:
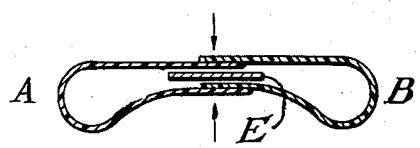
Figure 4:
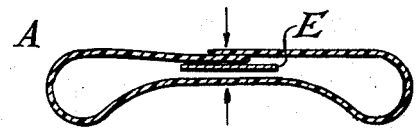
Fig. 4 shows in cross-section the formation of a tube with a single longitudinal lap weld, using a slip-sheet to prevent adherence between the weld and the diametrically opposite wall of the plastic tube.
Figure 6:
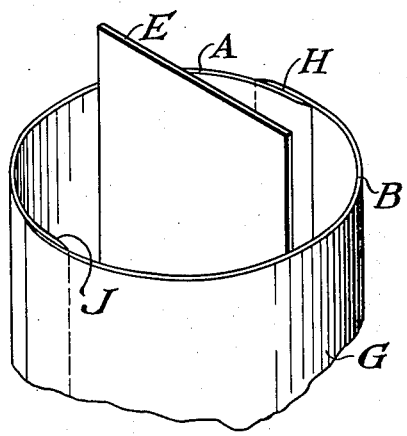
Figure 5:
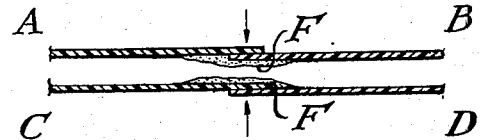
Fig. 5 illustrates the interposition of a coating of soap, or other non-fusible matter, instead of a slip-sheet; and, Fig. 6 represents a tube, prepared as in Fig. 3, with the slip-sheet being removed.

In practicing the invention, two sets of film sheets A—B and C—D (Fig. 1) are assembled with their edges overlapping, a slip-sheet E is interposed between the two sets of thermoplastic films, and heat and pressure are applied to the assembly at the overlapping zones to produce two welded sheets, each of which is nearly as wide as the sum of the widths of the sheets from which they are made. In like manner, three film sheets A—B—C may be assembled with two lapped joints, using a slip-sheet E, as in Fig. 2, and subjected to heat and pressure, to produce a single sheet whose width is nearly the sum of the widths of sheets A, B and C from which it was produced. Alternatively, two sheets A—B of thermoplastic film may each be bent so that the right edge of each overlaps the left edge of the other, as shown in Fig. 3, and subjected to welding temperature and pressure in like manner, with slip-sheet E centrally disposed to prevent one lap joint from sticking to the other, and a tube G may thereby be formed having two longitudinally welded seams H and J, the tube G having a circumference nearly equal to the sum of the original widths of sheets A and B. Slip-sheet E is removed in each case after the welding operation. The described operations permit the simultaneous production, between a single pair of welding elements, of two lap welds in the time usually required to produce one such weld in the same equipment.

In operating in accordance with the invention, any of the available types of film-welding equipment may be employed. The temperatures and pressures to be used will depend, in each case, on the composition of the films being welded, and will be the standard temperatures and pressures for the operation of the particular apparatus with the particular films. It is necessary that the apparatus employed be one which keeps pressure on the welded film long enough for the film to cool and for the weld to set, to avoid slipping between softened film surfaces.

The slip-sheet E, if one is used, may be paper, oiled silk, plain "Cellophane," or other thin sheet which is selected so as not to stick to the thermoplastic films when they are being welded.

When no slip-sheet is employed, some other removable barrier F must be interposed between the lapped joint and any other contiguous layer of the plastic, to prevent fusion thereof to the portions being welded. A thin layer F of liquid soap serves satisfactorily in most cases, but care must be taken to keep the soap from any of the surfaces which are to be joined in the welding operation. There may be used, instead of common soap, a layer F of talc, or of zinc stearate, or of sodium lauryl sulfate, or other preferably non-plastic, removable material. The use of a slip-sheet is generally preferable to the use of the other types of barriers, except when the articles produced are of such great length that removal of a slip-sheet becomes impractical. In such case, the continuous application of a non-plastic coating F on appropriate surfaces of the films to be joined may readily be effected.

As used herein, the terms "plastic" and "thermoplastic" are to be understood as meaning organic thermoplastics, and the films or sheets concerned are any such plastic sheets which are capable of being joined by heat and pressure, to form a weld. Such sheets include those made of rubber hydrochloride, vinyl polymers, polymeric acrylic and methacrylic acid esters, vinylidene chloride copolymers, cellulose acetate, cellulose acetate-butyrate, ethyl cellulose, and the like. The identity of the plastic employed is no part of the present invention, so long as it is capable of being welded by heat and pressure.

In actual operation, the method has been satisfactorily employed in making large tubes of transparent foil of Saran B—115 (a copolymer of vinylidene chloride and about 10–15 per cent of vinyl chloride). To illustrate, when it is desired to produce a tube 20 inches in diameter from films of this copolymer 0.002 inch thick, two such films, each 32 inches wide, are drawn from stock rolls, are bent in the manner illustrated in Fig. 3, with two overlaps of about 0.5 inch each, a strip of paper at least 3 to 5 inches wide is fed between the two pairs of lapped film edges, and the assembly is forwarded between opposed heating elements which bring the overlapped portions of the films briefly to a fusion temperature near 173° C., while pressure is applied at the heated zone to complete the weld, and to prevent slippage at the weld while the latter is cooling. The so-formed tube is cut transversely to the desired lengths, the paper strip is removed, and the tube is ready for use in packaging operations. If the two longitudinal welds were separately formed, there would be required either two welding machines or two passes through a single machine, and the only weld which could be formed conveniently is the edge or "fin" type of weld, which is not as strong or as neat as the lap weld.

When making a tube from a single sheet of film, there will be a double thickness of film along the overlap on one side of the slip-sheet, and only one layer of film diametrically opposite the weld line on the other side of the slip-sheet. In such case it is preferred to operate the welding machine with a heating element pressing against the lap weld, and to leave unheated the companion element, which slides along the single thickness of film not being welded. This prevents overheating, possible blistering, and loss of strength in the single tube wall.

I claim:

1. The method which comprises providing two films of uniform width of organic thermoplastic material, bending the two films to semicylindrical form about and at opposite sides of a common longitudinal axis, lapping the right edge of each with the left edge of the other, aligning one such lapped pair parallel with and opposite to the other such pair, interposing between the parallel pairs of lapped edges a thin, flexible barrier to prevent adherence between the two internally disposed members of the pairs of lapped edges, applying pressure to the assembly while heating each lapped joint externally to effect fusion and welding of the members of each pair between a single set of opposed heating elements, and cooling the so-formed welds, to produce a tube of organic thermoplastic film material with two longitudinal lap welds.

2. The method which comprises continuously supplying two films of uniform width of organic thermoplastic material, bending the two films to semicylindrical form about and at opposite sides of a common longitudinal axis, lapping the right edge of each with the left edge of the other, aligning one such lapped pair parallel with and opposite to the other such pair, continuously supplying and interposing between the two internally disposed members of the parallel pairs of lapped film edges a paper strip of width greater than the overlap of the films, applying just sufficient heat and pressure simultaneously to the external member of each of the said pairs between a single set of opposed heating elements, to effect fusion and welding of the two pairs of lapped edges, but insufficient to cause the plastic to adhere to the interposed paper strip, cooling the so-formed welds, cutting the resulting tube transversely to desired lengths, and removing the paper strip from the resulting tube.

CARROLL C. R. IRONS.

REFERENCES CITED

The following references are of record in the file of this patent:

UNITED STATES PATENTS

| Number | Name | Date |
| --- | --- | --- |
| 1,674,526 | Semple | June 19, 1928 |
| 1,920,961 | Anderson | Aug. 8, 1933 |
| 2,107,249 | Hepke | Feb. 1, 1938 |
| 2,114,625 | Bergstein | Apr. 19, 1938 |
| 2,192,527 | Salfisberg | Mar. 5, 1940 |
| 2,358,455 | Hallman | Sept. 19, 1944 |
| 2,381,074 | Muller et al. | Aug. 7, 1945 |